US007105138B2

(12) United States Patent
Hur et al.

(10) Patent No.: US 7,105,138 B2
(45) Date of Patent: Sep. 12, 2006

(54) MACROPOROUS PEROVSKITE MANGANESE OXIDES WITH HIGHLY ORDERED NANO-PORES AND METHOD OF PREPARING THE SAME

(75) Inventors: Nam Hwi Hur, Daejeon (KR); Young Nam Kim, Daejeon (KR); Eun Ok Chi, Daejeon (KR); Jin Cheol Kim, Seongnam-si (KR); Eun Kwang Lee, Gunsan-si (KR)

(73) Assignee: Korea Research Institute of Standards and Science, Daejeon (KR)

( * ) Notice: Subject to any disclaimer, the term of this patent is extended or adjusted under 35 U.S.C. 154(b) by 319 days.

(21) Appl. No.: 10/825,651

(22) Filed: Apr. 16, 2004

(65) Prior Publication Data

US 2006/0169945 A1    Aug. 3, 2006

(30) Foreign Application Priority Data

Nov. 21, 2003    (KR) .................. 10-2003-0083108

(51) Int. Cl.
*C01F 11/02* (2006.01)
*C01F 17/00* (2006.01)
*C01G 45/02* (2006.01)

(52) U.S. Cl. .................. 423/263; 423/593.1; 423/599; 423/594.16; 423/21.1; 423/49; 423/155

(58) Field of Classification Search ................ 423/263, 423/593.1, 599, 594.16, 21.1, 49, 155
See application file for complete search history.

(56) References Cited

U.S. PATENT DOCUMENTS

2004/0191150 A1* 9/2004 Yano et al. ................ 423/263
2004/0247511 A1* 12/2004 Mafune et al. ............ 423/263
2005/0266297 A1* 12/2005 Irvine et al. ................ 429/40
2006/0018815 A1* 1/2006 Suda .......................... 423/263
2006/0045840 A1* 3/2006 Chen et al. ................ 423/598

OTHER PUBLICATIONS

Eun Ok Chi, Young Nam Kim, Jin Chul Kim and Nam Hwi Hur, "A Macroporous Perovskite Manganite from Colloidal Templates with a Curie Temperature of 320 K," Che\mical of Material, vol. 15, No. 10, May 20, 2003, pp. 1929-1931.

* cited by examiner

*Primary Examiner*—Stanley S. Silverman
*Assistant Examiner*—Timothy C. Vanoy
(74) *Attorney, Agent, or Firm*—Finnegan, Henderson, Farabow, Garrett & Dunner, L.L.P.

(57) ABSTRACT

The present invention relates to the macroporous manganese oxide material having ferromagnetic property and a method of preparing the same, more particularly to the macroporous ferromagnetic manganese oxide having three-dimensionally ordered nanopores, which is prepared by aligning colloidal polymer particles with an average diameter of a few hundred nanometers in 3D, infiltrating a solution of the precursor compound capable of forming manganese oxide represented by the following Chemical Formula 1 into interstices of the colloidal template and heating in an oxygen atmosphere to decompose and remove the polymer template, and a method for preparing the same:

$$La_{1-x}Ca_{x-y}Sr_yMnO_3 \qquad (1)$$

wherein $0.25 < x < 0.35$ and $0 < y \leq 0.35$.

6 Claims, 3 Drawing Sheets

MACROPOROUS PEROVSKITE MANGANESE OXIDES WITH HIGHLY ORDERED NANO-PORES AND METHOD OF PREPARING THE SAME

BACKGROUND OF THE INVENTION

1. Field of the Invention

The present invention relates to the macroporous manganese oxide having ferromagnetic property and a method of preparing the same, more particularly to the macroporous ferromagnetic manganese oxide having three-dimensionally-ordered nanopores, which is prepared by aligning polymer colloidal particles with an average diameter of a few hundred nanometers, infiltrating a solution of the precursor compound capable of forming the manganese oxide represented by the following Chemical Formula 1 into interstices of the colloidal template, heating in an oxygen atmosphere to decompose and remove the polymer particles, and a method for preparing the same:

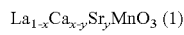

$La_{1-x}Ca_{x-y}Sr_yMnO_3$ (1)

wherein $0.25<x<0.35$ and $0<y\leq0.35$.

2. Description of Related Art

Only iron and a few other metals such as cobalt, nickel, and gadolinium can be made into strong magnets. These materials are said to be ferromagnetic. In addition, various iron oxides have also been known to have ferromagnetism from the ancient times. Accordingly, the ferromagnetic materials have been used as compasses and other useful tools. Ferromagnetism is not limited to iron-containing metal oxides, and is also found in other transition metal oxides with unpaired electrons. For example, a manganese oxide with perovskite structure shows ferromagnetism and also has conducting property. Heating a magnet can cause a loss in magnetism, for raising the temperature increases the random thermal motion of the atoms that tends to randomize the domains. Above a certain temperature known as the Curie temperature, a magnet cannot be made at all. The Curie temperature depends on the kind of metal. Generally, compounds containing iron have high Curie temperature. Iron oxide shows a ferromagnetic transition typically over 400 K and also has large saturated magnetic moment.

Since the ferrites have ferromagnetism but are insulating, their applications are limited to microwave devices or permanent magnets. On the contrary, the manganese oxides with perovskite structure show metal-insulator transition around the Curie temperature. They have metallic property in the ferromagnetism range while they are insulating in the paramagnetic region, namely above the Curie temperature. The Mn-based perovskite oxide is known to be colossal magneto resistance (CMR) material, which shows rapid decrease in resistance near the Curie temperature upon applying a magnetic field. Accordingly, researches on the manganese oxides have been focused until now on industrial application of this magneto resistance property. In this regard, many researches have been conducted to develop devices like magneto resistance sensors.

On the other hand, there have been few researches on application of the manganese oxides in magnetic filters or photonic devices. It is largely because manganese oxides are not hard enough to maintain their framework and also it is difficult to form pores inside the materials. If we can make such a strong manganese oxide, it can be used as magnetic filters or photonic devices. Because filters currently used are primarily made of silicon oxide or aluminum oxide, they cannot capture magnetic nanoparticles effectively. If the manganese oxide material is used with ferromagnetism as a filter, it can remove magnetic ions completely. Moreover, if pores having a diameter of several nanometers are highly ordered, it can be useful for photonic devices.

SUMMARY OF THE INVENTION

The present inventors completed this invention by preparing a macroporous manganese oxide film comprising manganese oxide represented by Chemical Formula 1 using a polymer template wherein spherical polymer colloidal particles are closely packed in 3D.

FIG. 1 is a schematic diagram showing the process of preparing the macroporous manganese oxide of the present invention. First, colloidal polymer particles with diameter of a few hundred nanometers are aligned in 3D on a glass plate. Then, the colloidal particles is heat-treated in an electric oven (about 80° C.) to form a close-packed polymer template. A precursor solution having the composition of corresponding manganese oxide is infiltrated into interstices of the polymer template. Then, it is heat-treated around 700 to 800° C. after drying. In the sintering process, the polymer template is completely removed, thereby leaving spherical voids. The organic molecules in the precursor that had filled the interstices are also decomposed. Consequently, a ferromagnetic framework composed of the manganese oxide wherein spherical voids are aligned in 3D is obtained.

Thus prepared ferromagnetic manganese oxide of the present invention has the following advantages over the conventional macroporous membranes composed of silica or alumina: First, spherical voids are aligned well in 3D. Second, the resulting manganese oxide framework has ferromagnetism.

The $La_{1-x}Ca_{x-y}Sr_yMnO_3$ compound, which is a characteristic of the present invention, offers a macroporous ferromagnetic material having 3D-ordered spherical voids. Such a porous and magnetic material is novel that has not been developed yet. Also, preparation of the macroporous ferromagnetic material using nano-sized colloidal polymers as template is a unique method first developed by the present inventors.

Thus, an object of the present invention is to provide a ferromagnetic and porous manganese oxide that is mechanically stable and has a Curie temperature higher than room temperature, and a method of preparing the same.

DETAILED DESCRIPTION OF THE PREFERRED EMBODIMENTS

The present invention relates to macroporous ferromagnetic manganese oxides having a composition of lanthanum doped with calcium and strontium, as in Chemical Formula 1 below, and having 3D-ordered nanopores:

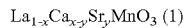

$La_{1-x}Ca_{x-y}Sr_yMnO_3$ (1)

wherein $0.25 < x < 0.35$ and $0 < y \leqq 0.35$.

The present invention also relates to a method of preparing the macroporous manganese oxide comprising the steps of fabricating close-packed polymer templates in 3D, infiltrating a solution of a precursor having the composition of Chemical Formula 1, and heat-treating it in an oxygen atmosphere.

Hereunder is given a more detailed description of the present invention.

In the present invention, it is important to fabricate a close-packed template wherein polymer colloidal particles are well aligned in 3D. The template is fabricated by dispersing polymer colloids with uniform diameter of a few hundred nanometers in water and slowly evaporating water in an electric oven at from 70 to 90° C. After sufficient drying of the polymer template, a solution of precursor having the appropriate composition is infiltrated into interstices of the colloidal particles, and the organic materials comprised in the precursor are decomposed and removed by sintering at high temperature (700 to 800° C.). For the precursor compounds, $La(CH_3CO_2)_3.H_2O$, $Ca(CH_3CO_2)_2.H_2O$, $Sr(CH_3COCHCOCH_3)_2$, and $Mn(CH_3CO_2)_2.4H_2O$ were used. For the organic polymer, any polymer that is decomposed at 700 to 800° C. may be used. Particularly, polymethylmethacrylate (PMMA) is preferable because the precursor solution is well adsorbed to the PMMA surface.

The $La_{1-x}Ca_{x-y}Sr_yMnO_3$ materials represented by Chemical Formula 1, which exhibit ferromagnetic property, will be referred to as "LCSMO" hereinafter.

In preparing a hard LCSMO framework, concentration of the precursor solution plays a very important role. The preferable concentration ranges from 0.06 to 0.20 M. If the concentration is higher than the above range, the precursor solution cannot infiltrate well into the interstices. On the other hand, if the concentration is lower than the above range, the oxide template becomes very weak and brittle.

For the LCSMO membrane to be used as a filter, it should be strong enough to retain its framework under certain pressure. By doping strontium into the calcium site, we have successfully fabricated the hard LCSMO material. The higher the strontium content (y), the stronger the membrane.

Figure 1:
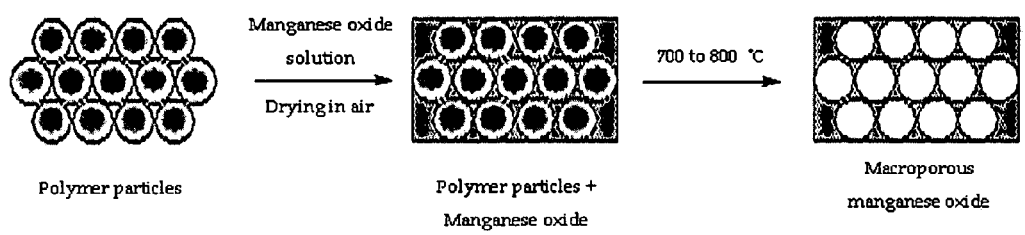
FIG. 1 is a schematic diagram showing the process of preparing the macroporous manganese oxide of the present invention using polymer colloids.
Figure 2:
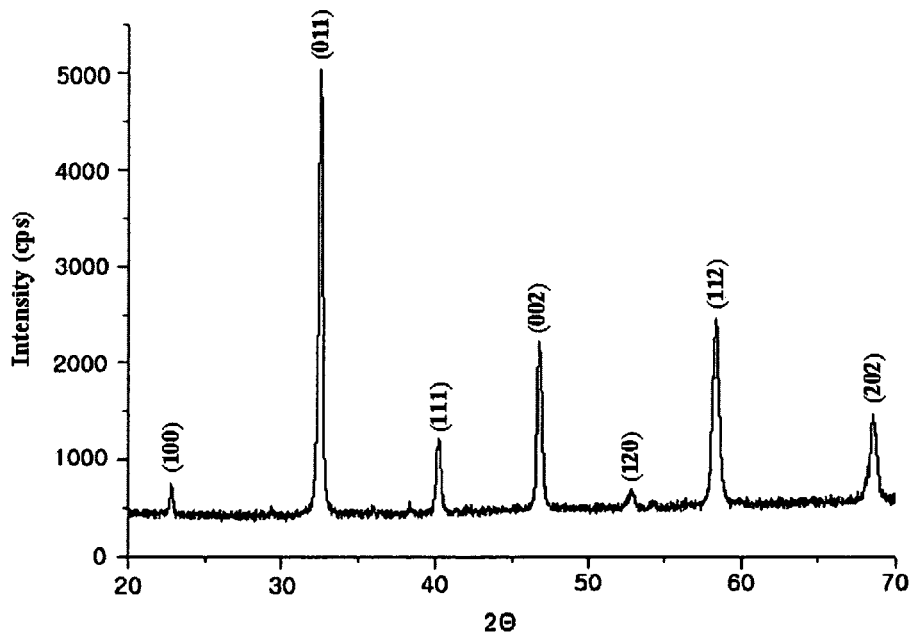
FIG. 2 is a powder X-ray diffraction pattern of $La_{1-x}Ca_{x-y}Sr_yMnO_3$ (x=0.3, y=0.1) of the present invention.
Figure 3:
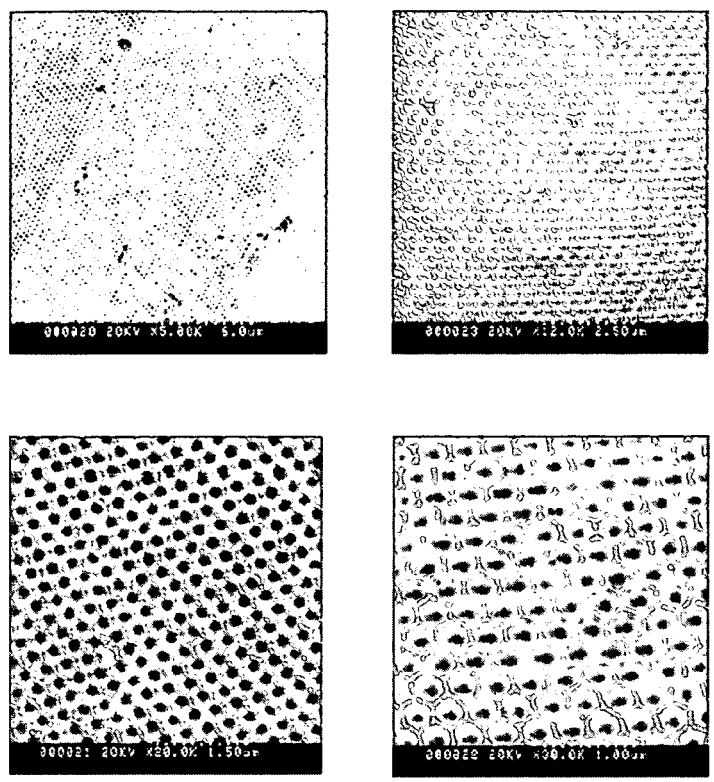
FIG. 3 shows a scanning electron micrograph of $La_{1-x}Ca_{x-y}Sr_yMnO_3$ (x=0.3, y=0.1) of the present invention taken at room temperature.
Figure 4:
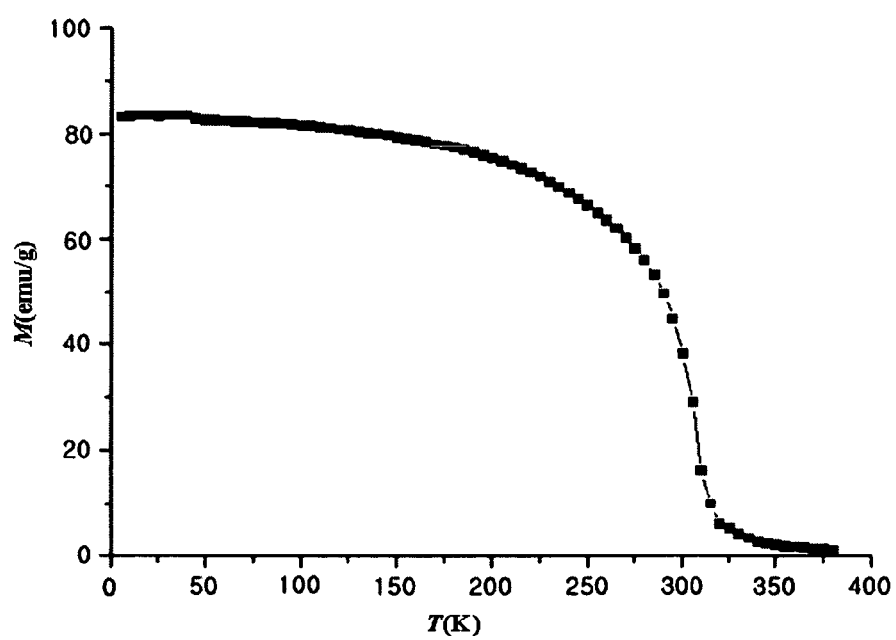
FIG. 4 is the temperature dependent magnetization curve of $La_{1-x}Ca_{x-y}Sr_yMnO_3$ (x=0.3, y=0.1) of the present invention.
Figure 5:
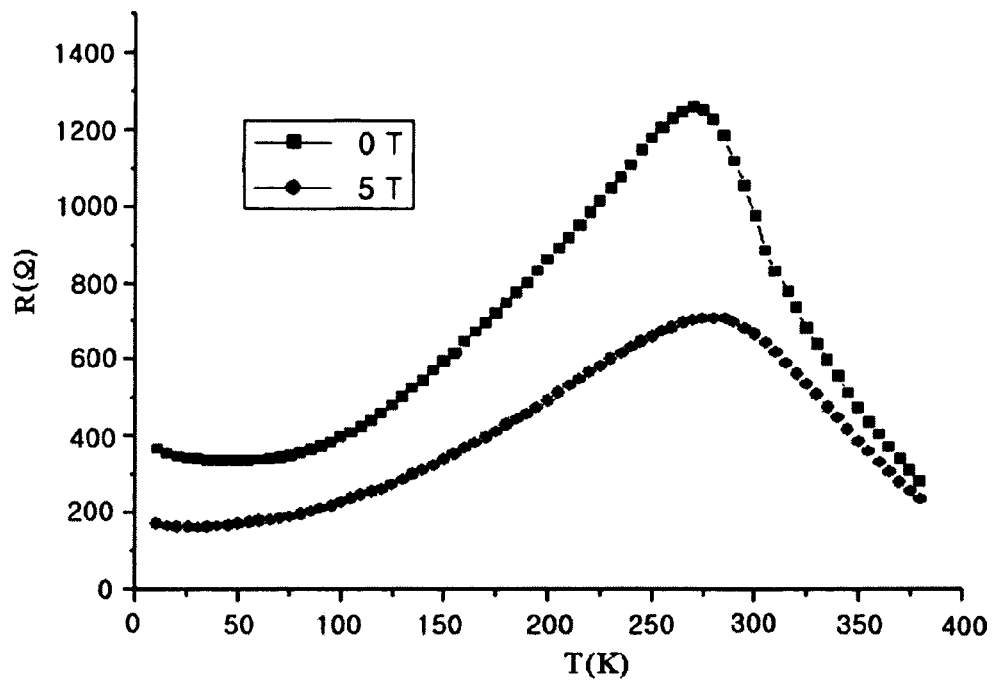
FIG. 5 is the temperature dependence of resistivity and magneto resistance of $La_{1-x}Ca_{x-y}Sr_yMnO_3$ (x=0.3, y=0.1) of the present invention.

FIG. 2 is a graph showing powder X-ray diffraction pattern of LCSMO of the present invention. All the diffraction peaks are slightly broadened because of the presence of nano-sized grains. Accordingly, all the diffraction peaks were indexed on a pseudo cubic unit cell rather than an orthorhombic cell. The LCSMO (x=0.3, y=0.1) material prepared in Example 1 did not contain any impure phase and had a lattice parameter of a=3.845 Å. As seen in the scanning electron micrograph of FIG. 3, the macroporous LCSMO material of the present invention has spherical voids well aligned in 3D. Each spherical void is well connected to its neighboring spherical voids through small windows, offering almost perfect LCSMO template. FIG. 4 is a curve showing the temperature dependence of magnetization of the same material. As seen in the figure, the ferromagnetic transition temperature is around 320 K, about 60 K higher than the sample without strontium. FIG. 5 is a curve showing the temperature dependence of resistivity and magneto resistance of the same LCSMO material.

Hereinafter, this invention is further illustrated by the following examples. However, these examples should not be construed as limiting the scope of this invention in any manner.

EXAMPLE 1

Preparation of $La_{1-x}Ca_{x-y}Sr_yMnO_3$ (x=0.3, y=0.1)

A precursor solution was infiltrated into a template wherein polymethylmethacrylate (PMMA) polymer colloidal particles having a diameter of about 400 nm had been well aligned in 3D to prepare a macroporous LCSMO material. The colloidal template had a size of about 20 mm×10 mm×2 mm, and had been sufficiently dried in an oven. The precursor solution had been prepared by adding accurately weighed $La(CH_3CO_2)_3.H_2O$ (2.21 g), $Ca(CH_3CO_2)_2.H_2O$ (0.36 g), $Sr(CH_3COCHCOCH_3)_2$ (0.29 g), and $Mn(CH_3CO_2)_2.4H_2O$ (2.48 g) in 50 mL of 2-methoxyethanol, stirring the solution, and then adding 2 mL of strong nitric acid. This solution was distilled at about 130° C. to remove most of the solvent, and then distilled again after adding about 30 mL of 2-methoxyethanol. This process was repeated about 2 to 3 times to obtain a slightly viscous solution with the manganese concentration being about 1 M.

Thus obtained LCSMO solution was made less viscous by adding ethanol. The volume of ethanol was about 2 to 3 times that of the LCSMO solution. Thus prepared solution was dropped on the polymer template. After having the solution infiltrate completely in air, the template was dried for about a day in a desiccator. After drying sufficiently, the LCSMO solution was infiltrated again, and the template was dried. This process was reiterated for 4 to 5 times to obtain a precipitate having the LCSMO composition in the interstices of the colloidal template. Completely dried sample was heat-treated in the air of about 500° C. to completely remove the polymer template. After the template was removed, heat treatment was carried out while blowing oxygen at about 700 to 800° C. to obtain pure LCSMO with improved crystalline grains and strength.

Powder X-ray diffraction pattern (FIG. 2), scanning electron micrograph (FIG. 3), temperature dependence of magnetization (FIG. 4) and temperature dependence of resistivity and magneto resistance (FIG. 5) of the prepared macroporous ferromagnetic LCSMO material were analyzed.

EXAMPLE 2

Preparation of $La_{1-x}Ca_{x-y}Sr_yMnO_3$ (x=0.3, y=0.05)

The material with the above composition was prepared in the same manner of Example 1, adjusting the contents of $Ca(CH_3CO_2)_2.H_2O$ and $Sr(CH_3COCHCOCH_3)_2$ stoichiometically. The filled template was sintered about 700 to 800° C. in an oxygen atmosphere.

EXAMPLE 3

Preparation of $La_{1-x}Ca_{x-y}Sr_yMnO_3$ (x=0.3, y=0.2)

The material with the above composition was prepared in the same manner of Example 1, adjusting the contents of $Ca(CH_3CO_2)_2.H_2O$ and $Sr(CH_3COCHCOCH_3)_2$ stoichiometically. The filled template was sintered about 700 to 800° C. in an oxygen atmosphere.

EXAMPLE 4

Preparation of $La_{1-x}Ca_{x-y}Sr_yMnO_3$ (x=0.3, y=0.3)

The material with the above composition was prepared in the same manner of Example 1, not using $Ca(CH_3CO_2)_2 \cdot H_2O$ and adding only $Sr(CH_3COCHCOCH_3)_2$ stoichiometrically. The filled template was sintered about 700 to 800° C. in an oxygen atmosphere.

COMPARATIVE EXAMPLE 1

Preparation of $La_{1-x}Ca_{x-y}Sr_yMnO_3$ (x=0.3, y=0.0)

The material with the above composition was prepared in the same manner of Example 1, not adding $Sr(CH_3COCHCOCH_3)_2$. The filled template was sintered about 700 to 800° C. in an oxygen atmosphere. Thus obtained macroporous sample was more brittle than the strontium-doped sample. Also, it had a ferromagnetic transition temperature of about 260 K, which is lower than that of the strontium-doped sample.

Figure 6:
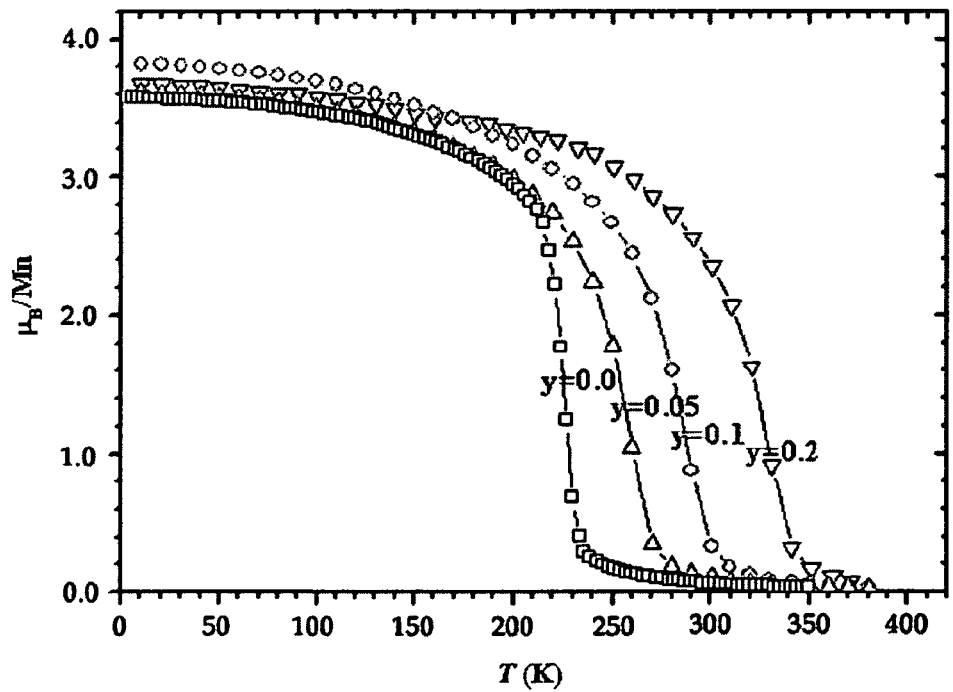
FIG. 6 is the temperature dependent magneto resistance of $La_{1-x}Ca_{x-y}Sr_yMnO_3$ of the present invention, wherein the lanthanum content (x) is fixed at 0.3 but the strontium content (y) varies 0.0, 0.05, 0.1 and 0.2, respectively.

Samples prepared in Examples 1 to 4 and Comparative Example 1 were heat-treated at 700 to 800° C. for 12 hours in an oxygen atmosphere. FIG. 6 shows temperature dependence of magnetization on the degree of strontium doping (y value). It shows distinct change of critical temperature with the degree of strontium doping.

COMPARATIVE EXAMPLE 2

The LCSMO material was prepared in the same manner of Example 1, but the sample was sintered in air. The ferromagnetic transition temperature was about 20 K lower than the oxygen-annealed sample.

COMPARATIVE EXAMPLE 3

The LCSMO material was prepared in the same manner of Example 1, performing heat treatment beyond the temperature range of 700 to 800° C. When the temperature was below 700° C., the LCSMO phase was not formed. When the temperature was higher than 800° C., the LCSMO template melted, and thus no macroporous sample was obtained.

COMPARATIVE EXAMPLE 4

The LCSMO material was prepared in the same manner of Example 1, in which the precursor solution was used without diluting with ethanol. The solution hardly infiltrated into the interstices of the colloidal template, and thus no macroporous film was formed.

PREPARATION EXAMPLE 1

Measurement of Curie Temperature and Strength

Ferromagnetic transition temperature (Curie temperature) and strength of the samples prepared in Examples 1 to 4 and Comparative Examples 1 to 4 were measured. The result is shown in Table 1 below. Ferromagnetic transition temperature was measured with a SQUID magnetometer. If the film was broken when pressed with a finger, it was evaluated as "weak". If the film was not broken when pressed with a finger, it was evaluated as "strong".

TABLE 1

| Classification | Curie temperature (K.) | Formation of 3D ordered nanopores | Strength of porous sample |
|---|---|---|---|
| Example 1 | 300 | Good | Strong |
| Example 2 | 275 | Good | Strong |
| Example 3 | 340 | Good | Strong |
| Example 4 | 370 | Good | Strong |
| Comparative Example 1 | 240 | Good | Weak |
| Comparative Example 2 | 280 | Good | Strong |
| Comparative Example 3 | 300 | Poor | Strong |
| Comparative Example 4 | 300 | Poor | Strong |

As described in detail above, the ferromagnetic LCSMO sample of the present invention, which has 3D-ordered spherical voids, is a macroporous membrane that has never been developed as yet. Since it is strong and has a ferromagnetic transition temperature higher than room temperature, it can be utilized for separation and purification of metal ions thus replacing the conventional alumina filter. Further, it may be utilized as optical switching devices since the spherical voids are well ordered in 3D.

While the present invention has been described in detail with reference to the preferred embodiments, those skilled in the art will appreciate that various modifications and substitutions can be made thereto without departing from the spirit and scope of the present invention as set forth in the appended claims.

What is claimed is:

1. A macroporous manganese oxide material comprising the composition represented by the following Chemical Formula 1, wherein calcium and strontium are doped in lanthanum sites, and having 3D-ordered nano-sized pores:

$$La_{1-x}Ca_{x-y}Sr_yMnO_3 \qquad (1)$$

wherein 0.25<x<0.35 and 0<y≦0.35.

2. A method of preparing the macroporous ferromagnetic manganese oxide material comprising the steps of: aligning polymer colloidal particles with nanometer size well in 3D, infiltrating a solution of a precursor of the composition represented by the following Chemical Formula 1 into interstices of the colloidal template, and heat-treating the same in an oxygen atmosphere:

$$La_{1-x}Ca_{x-y}Sr_yMnO_3 \qquad (1)$$

wherein 0.25<x<0.35 and 0<y≦0.35.

3. The method of preparing the macroporous ferromagnetic manganese oxide material according to claim 2, wherein the precursor compounds used are $La(CH_3CO_2)_3 \cdot H_2O$, $Ca(CH_3CO_2)_2 \cdot H_2O$, $Sr(CH_3COCHCOCH_3)_2$ and $Mn(CH_3CO_2)_2 \cdot 4H_2O$.

4. The method of preparing the macroporous ferromagnetic manganese oxide material according to claim 2 or claim 3, wherein the concentration of the precursor ion is 0.06 to 0.20 M.

5. The method of preparing the macroporous ferromagnetic manganese oxide material according to claim 2, wherein the polymer colloidal particles are polymethylmethacrylate.

6. The method of preparing the macroporous ferromagnetic manganese oxide material according to claim 2, wherein the heat treatment is carried out at 700 to 800° C.

* * * * *

UNITED STATES PATENT AND TRADEMARK OFFICE
CERTIFICATE OF CORRECTION

| | | |
|---|---|---|
| PATENT NO. | : 7,105,138 B2 | Page 1 of 1 |
| APPLICATION NO. | : 10/825651 | |
| DATED | : September 12, 2006 | |
| INVENTOR(S) | : Nam Hwi Hur et al. | |

It is certified that error appears in the above-identified patent and that said Letters Patent is hereby corrected as shown below:

In Claim 4, Col. 6, Line 57, "ion" should read --solution--.

Signed and Sealed this

Tenth Day of April, 2007

JON W. DUDAS
*Director of the United States Patent and Trademark Office*